(12) United States Patent
Suh

(10) Patent No.: US 6,176,627 B1
(45) Date of Patent: Jan. 23, 2001

(54) METHOD OF CONTROLLING EXPOSURE OF CAMERA AND DIAPHRAGM DRIVING DEVICE FOR PERFORMING SAME

(75) Inventor: Jae-gyeong Suh, Kyungsangnam-do (KR)

(73) Assignee: Samsung Aerospace Industries, Ltd., Seoul (KR)

(*) Notice: Under 35 U.S.C. 154(b), the term of this patent shall be extended for 0 days.

(21) Appl. No.: 09/122,893

(22) Filed: Jul. 28, 1998

(30) Foreign Application Priority Data

Jul. 29, 1997 (KR) .................................. 97-35812

(51) Int. Cl.⁷ ..................................................... G03B 9/08
(52) U.S. Cl. ........................... 396/451; 396/460; 396/497
(58) Field of Search .................................. 396/449, 451, 396/459, 460, 463, 497, 508, 510, 505

(56) References Cited

U.S. PATENT DOCUMENTS 4,426,145 * 1/1984 Hashimoto ........................... 396/451

* cited by examiner

Primary Examiner—David M. Gray
(74) Attorney, Agent, or Firm—Howrey Simon Arnold & White, LLP

(57) ABSTRACT

A diaphragm driving device for a camera with a single type sector includes a shutter base, a driver installed on the shutter base, and a diaphragm ring rotatably placed on the shutter base with the same center and connected to the driving source to receive rotational force from the driving source. The diaphragm ring has a cam side composed of a plurality of circular arc portions spaced apart from each other with a respective radius corresponding to an appropriate diaphragm value and rectilinear portions interconnecting the neighboring circular arc portions. A sector opening and closing device is rotatably fixed on the shutter base at its bottom portion. The head of the sector opening and closing device contacts the cam side of the diaphragm ring. The sector opening and closing device opens and closes the sector by rotating along the cam side. A desired aperture value is pre-determined by stopping rotation of the diaphragm ring when the sector opening and closing device is positioned on one of the circular arc portions corresponding to the aperture value. Thereafter, opening and closing speeds of the sector assembly is established.

13 Claims, 5 Drawing Sheets

METHOD OF CONTROLLING EXPOSURE OF CAMERA AND DIAPHRAGM DRIVING DEVICE FOR PERFORMING SAME

BACKGROUND OF THE INVENTION (a) Field of the Invention

The present invention relates to a camera exposure controlling method camera and a diaphragm driving device for controlling the camera exposure and, more particularly, to a diaphragm driving device that prevents an overrun defect, employing the aperture-priority method.

(b) Description of the Related Art

Generally, in order to determine the amount of camera exposure, a method of controlling F-numbers, which indicate the relative size of the lens aperture opening (for example, 1.4, 2.8, 4, 5.6, 8, 11, 16, 22, etc.), or a method of controlling the shutter speed (which typically has values of B, 1, 2, 4, 1/30, 1/60, 1/125, 1/250, 1/500, 1/1000, etc.), can be used.

Among the methods, the former is called "aperture priority method" while the latter called the "shutter speed priority method".

When a camera has a diaphragm and a shutter, as a separate item, either the aperture priority method or the shutter priority method can be implemented without any difficulty depending on the situation. However, when a diaphragm is used for a shutter as well as for controlling the aperture, the aperture and the shutter speed are controlled at the same time. In the latter case, the sector may be formed as a single type or a double type.

In the single type sector, as shown in FIG. 7, a diaphragm ring 200 for controlling the aperture has a cam 202 contacting a sector opening and closing device 204. Because this cam 202 has a smooth surface to enable continuous movement, the single type sector tends to have overexposure problems, shown as R in FIG. 6. Although the rotating diaphragm ring 200 stops at a predetermined position on the cam 202, inertia may force the diaphragm ring to overrun after the diaphragm ring stops at the right position with a diminishing oscillation. Because of this overrun exposure, the total amount of light reaching the film plane cannot be uniformly controlled.

Therefore, an aperture priority method cannot be employed in such a single type sector.

A double type sector has a first set of sectors that is used to control the aperture and a second set of sectors that is used to control the shutter speed. Therefore, while a double type sector may prevent the overrun exposure problem, it requires a complicated mechanism and an expensive complex structure.

SUMMARY OF THE INVENTION

It is an object of the present invention to provide a method of controlling a camera exposure with a diaphragm driving device capable of preventing overrun exposure problems as well as implementing the aperture priority method even with a single type sector.

This and other objects may be achieved by a diaphragm driving device including a shutter base, a driver installed on the base, and a diaphragm ring rotatably placed on the shutter base with the same center and connected to the driver to receive rotational force therefrom. The diaphragm ring has a cam along its circumference composed of a plurality of circular arc portions, that are spaced apart from each other by a respective radius corresponding to each aperture, and connecting portions interconnecting the adjoining circular arc portions. The connecting portions may be formed with rectilinear portions or curved portions. A rotatable sector opening and closing device is fixed on the shutter base. The head of the sector opening and closing device contacts the cam side of the diaphragm ring. This sector opening and closing device rotates along the cam side to open and close the sector.

In the camera exposure controlling method, a desired aperture is set by stopping rotation of the diaphragm ring when the sector opening and closing device reaches the circular arc portion corresponding to the correct aperture. Thereafter, the opening time of the shutter is determined.

BRIEF DESCRIPTION OF THE DRAWINGS

A more complete appreciation of the invention, and many of the advantages thereof, will be readily apparent by reference to the following detailed description when considered in conjunction with the accompanying drawings.

DETAILED DESCRIPTION OF THE INVENTION

Figure 1:
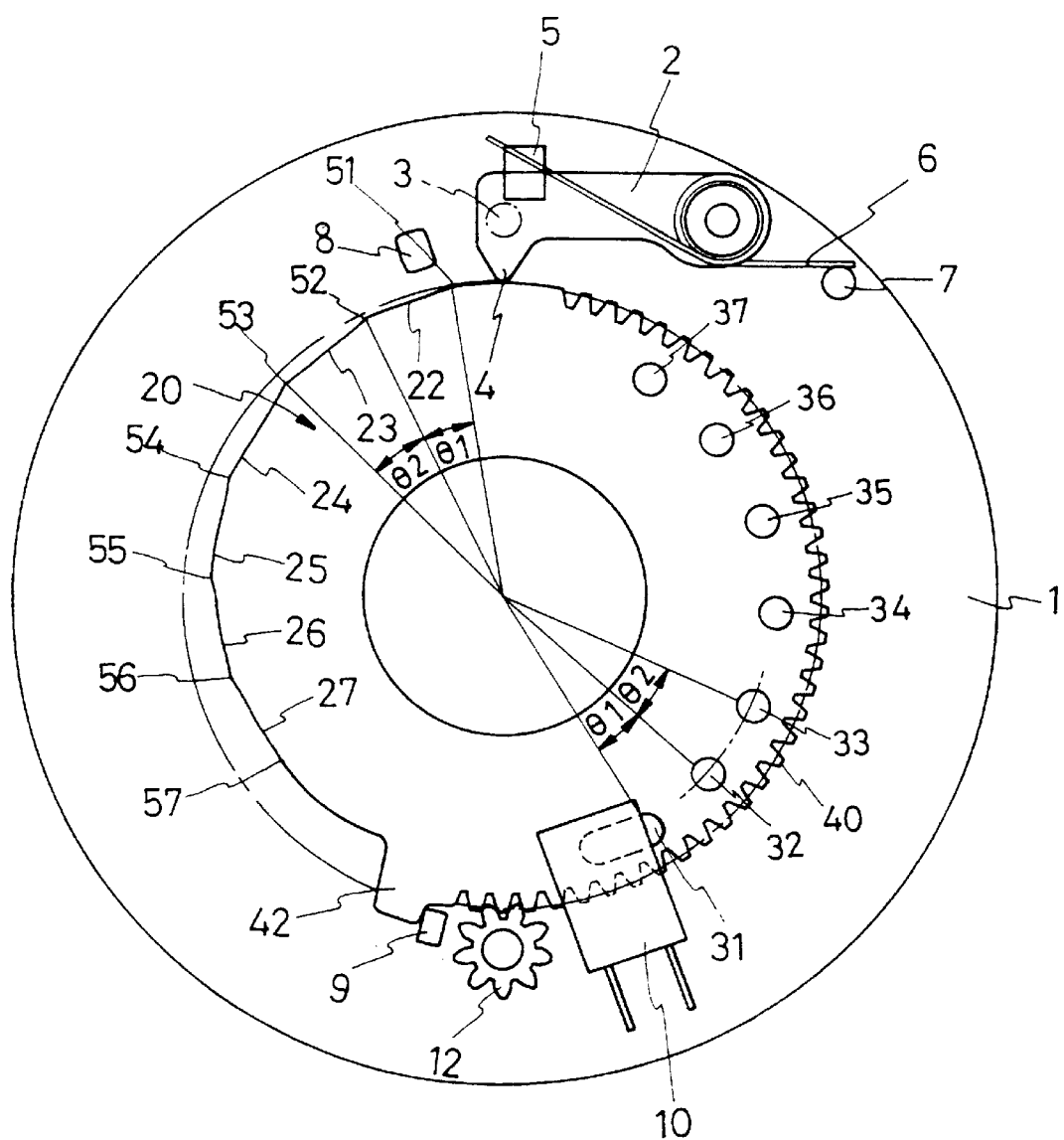
FIG. 1 is a front view of a diaphragm driving device at its initial setting according to a preferred embodiment of the present invention.
Figure 2:
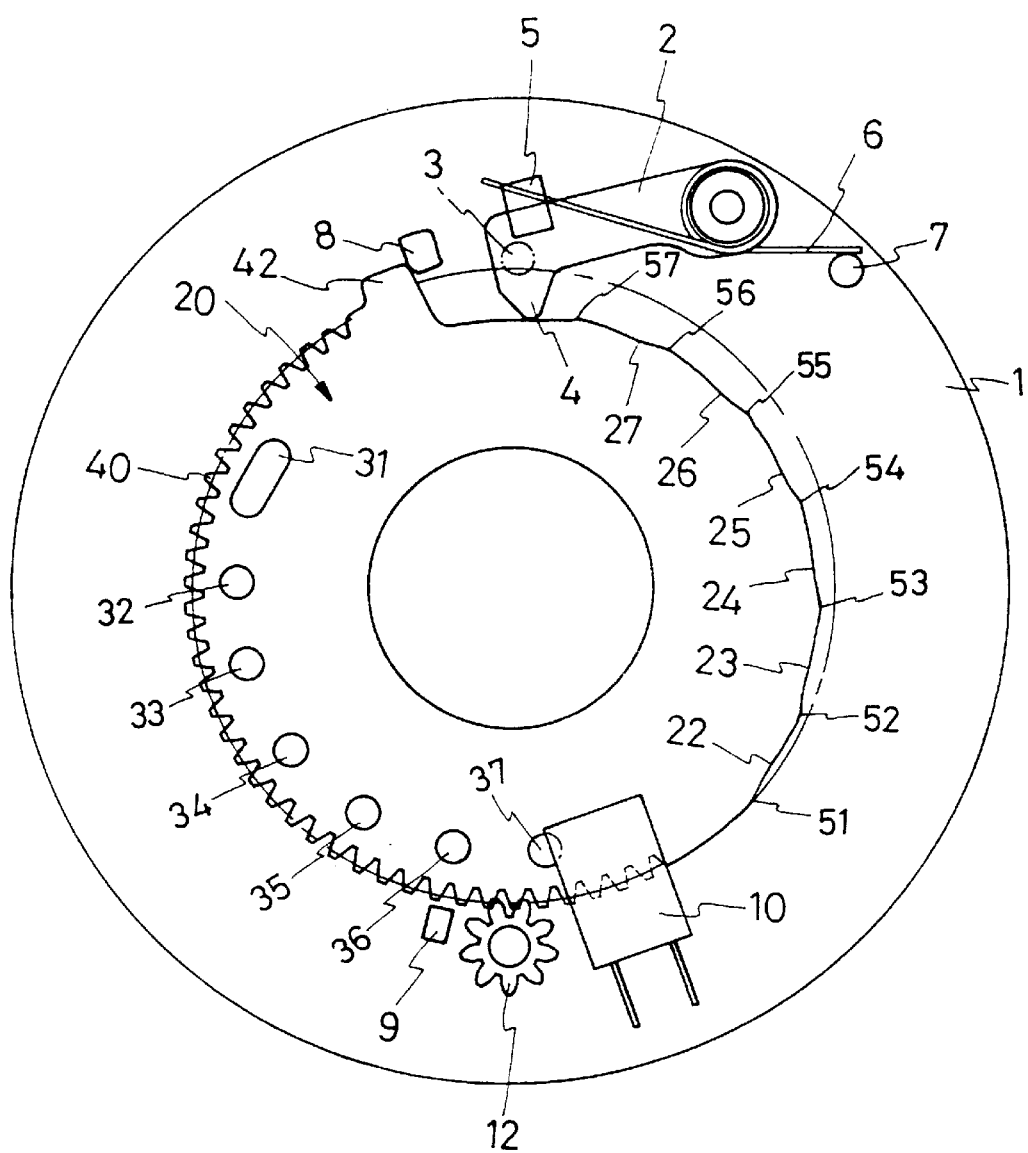
FIG. 2 is a front view of the diaphragm driving device shown in FIG. 1 when it is fully open.
Figure 3:
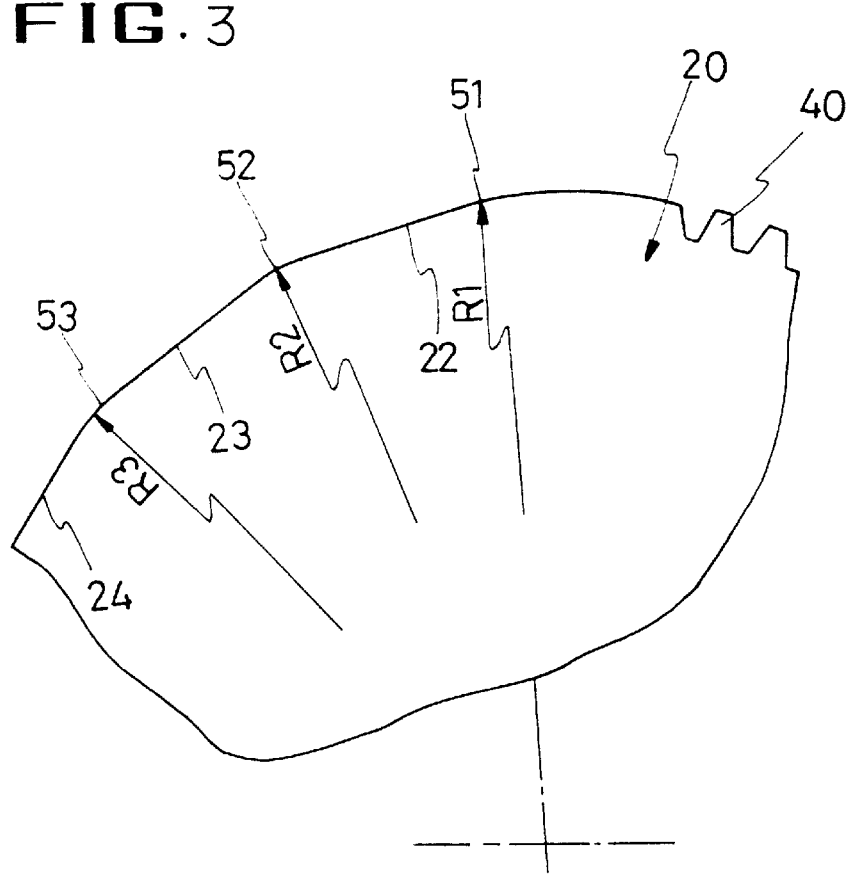
FIG. 3 is an enlarged view of the diaphragm driving device shown in FIG. 1.

FIGS. 1 to 3 show a diaphragm driving device according to a preferred embodiment of the present invention. This preferred embodiment employs a single type sector (not shown) that functions as both a diaphragm and a shutter.

As shown in FIGS. 1 to 3, the diaphragm driving device includes a shutter base 1 and a driver 12 with a plurality of gear teeth installed on the base 1, a diaphragm ring 20 rotatably placed on the shutter base 1 with the same center as the shutter base 1 and connected to the driver 12 to receive rotational force therefrom, and a sector opening and closing device 2 rotatably fixed on the shutter base.

The diaphragm ring 20 has a cam side composed of a plurality of circular arc portions 51 to 57 spaced apart from each other with varying distances there between and connecting portions interconnecting the circular arc portions 51 to 57. For the purpose of clarification, in this embodiment, the connecting portions will be described based on the rectilinear portions 22 to 27 shown in FIG. 1.

Each of the circular arc portions 51 to 57 has an intrinsic radius corresponding to an appropriate aperture. Each of the rectilinear line portions 22 to 27 interconnects the neighboring circular arc portions 51 to 57, respectively. The sector opening and closing device 2 switches the sector by rotating along the cam side of the diaphragm ring 20.

The circular arc portions 51 to 57 are concentric with the shutter base 1 and have radii R1 to R7 which gradually reduce in reference to the center of the shutter base 1.

The side of the diaphragm ring 20 opposite to the cam side is formed with gear teeth 40. The gear teeth 40 are engaged with the driver 12.

A stopper 42 is provided between the cam side and the gear side to confine the rotational limit of the diaphragm ring 20. Correspondingly, the shutter base 1 has two projections 8 and 9 at the starting point and the ending point of rotation, respectively. The projections 8 and 9 hold the stopper 42 to stop the further rotation of the diaphragm ring 20.

The bottom portion of the sector opening and closing device 2 is rotatably fixed on the shutter base 1 with an elastic member 6 thereon. The top portion of the sector opening and closing device 2 is formed with a position detecting head 4 contacting the cam side of the diaphragm ring 20 to detect its position, a driving pin 3 that drives the sector and a fixation member 5 for fixing one end of the elastic member 6. The driving pin 3 and the fixation member 5 are separately disposed in the vicinity of the position detecting head 4. The opposite end of the elastic member 6 is hung by a projection 7 formed on the shutter base 1. The elastic member 6 is a twisted spring in this embodiment.

A plurality of position indicating holes 31 to 37 are formed on the diaphragm ring 20 in a substantially symmetrical fashion with respect to the circular arc portions 51 to 57. A position sensing member 10 is fixed on the shutter base 1 to sense the position indicating holes 31 to 37.

The initial position indicating hole 31 that detects the circular arc portion 51 has a relatively large length compared to other position indicating holes 32 to 37.

The position sensing member 10 is formed with a photo-interrupter. The photo-interrupter 10 is positioned at the area where the initial position indicating hole 31 is placed when the diaphragm ring 20 is in the initial position. As shown in FIG. 1, the initial position indicating hole 31 is formed at the position corresponding to the circular arc portion 51 which is in turn formed at the position corresponding to the initial position of the diaphragm ring 20. The next hole 32 is spaced apart from the initial position indicating hole 31 at an angle θ1 formed by the circular arc portion 51 and the next circular arc portion 52 based on the center of the diaphragm ring 20. In the same way, other position indicating holes 33 to 37 are formed sequentially at angles θ2 to θ6.

The method of controlling the camera exposure using the aforementioned diaphragm driving device will be now described in detail.

When the user pushes a shutter release button (not shown), the driver 12 rotates. The rotational force of the driver 12 is then applied to the diaphragm ring 20 so that it is rotated in a clockwise direction. Before the rotation of the diaphragm ring 20, the position detecting head 4 of the sector opening and closing device 2 contacts the circular arc portion 51 at the initial position.

When the diaphragm ring 20 rotates, the position detecting head 4 is in a state of receiving force from the elastic member 6 toward the cam side of the diaphragm ring 20. Thus, with the rotation of the diaphragm ring 20, the sector opening and closing device 2 rotates counterclockwise while contacting the rectilinear line portions 22 to 27 and the circular arc portions 51 to 57. Accordingly, the driving pin 3 formed on the sector opening and closing device 2 operates to open the sector (shutter mechanism not shown).

When the position detecting head 4 of the sector opening and closing device 2 contacts one of the circular arc portions 51 to 57 corresponding to a desired aperture, the driver 12 stops for a predetermined time and the diaphragm 20 also stops rotating.

In this embodiment, even if the position detecting head 4 overrun due to inertia, it remains within the area of the corresponding circular arc portion with a predetermined radius. Thus, the position detecting head 4 and the driving pin 3 maintains their position uniformly, keeping the opening of the diaphragm as intended for an appropriate aperture. The opening of the diaphragm can be uniformly kept as long as the position detecting head 4 contacts the same circular arc portion. For this purpose, the circular arc portions 51 to 57 should be big enough to prevent the position detecting head 4 from overrunning beyond those portions to cause an overexposure.

When the diaphragm ring 20 stands still during the predetermined time, the sector opening and closing device 2 also stops for an appropriate lens opening. After the exposure, the driver 12 rotates inverse and, at the same time, the diaphragm ring 20 rotates counterclockwise by rotation of the driver 12. Accordingly, the sector opening and closing device 2 rotates clockwise and closes the diaphragm shutter.

As described above, the photo-interrupter 10 senses the position indicating holes 31 to 37 to find a correct position corresponding to the desired aperture.

Figure 5A:
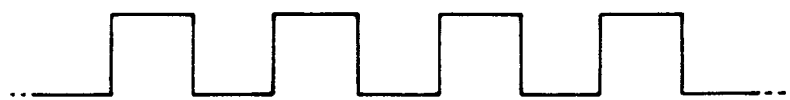
FIG. 5A is a pulse wave form chart showing control pulses of a photo-interrupter according to the preferred embodiment.
Figure 5B:
FIG. 5B is a pulse wave form chart showing a low state pulse having a relatively long pulse width sensed by the photo-interrupter at the initial position of a diaphragm ring according to the preferred embodiment.
Figure 5C:
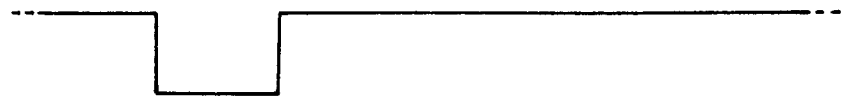
FIG. 5C is a pulse wave form chart showing a low state pulse having a relatively short pulse width sensed by the photo-interrupter at the operated positions of the diaphragm ring according to the preferred embodiment.
Figure 6:
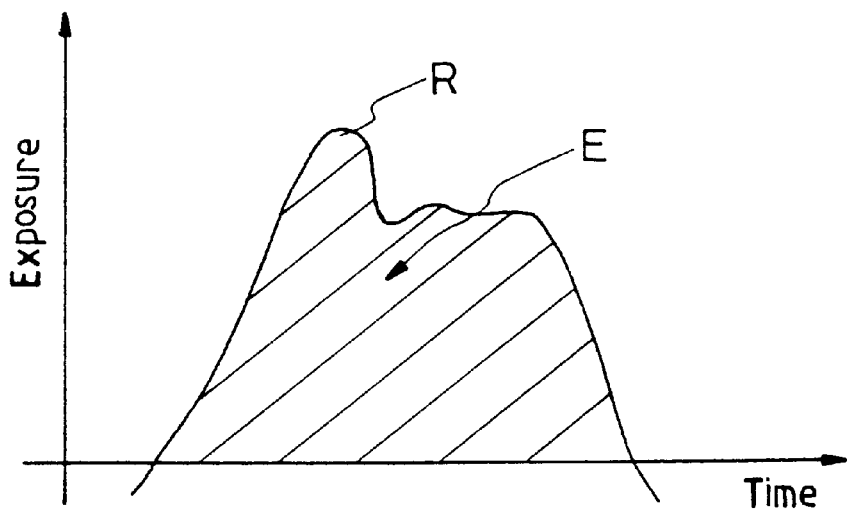
FIG. 6 is a graph showing the amount of camera exposure as a function of time according to the prior art.
Figure 7:
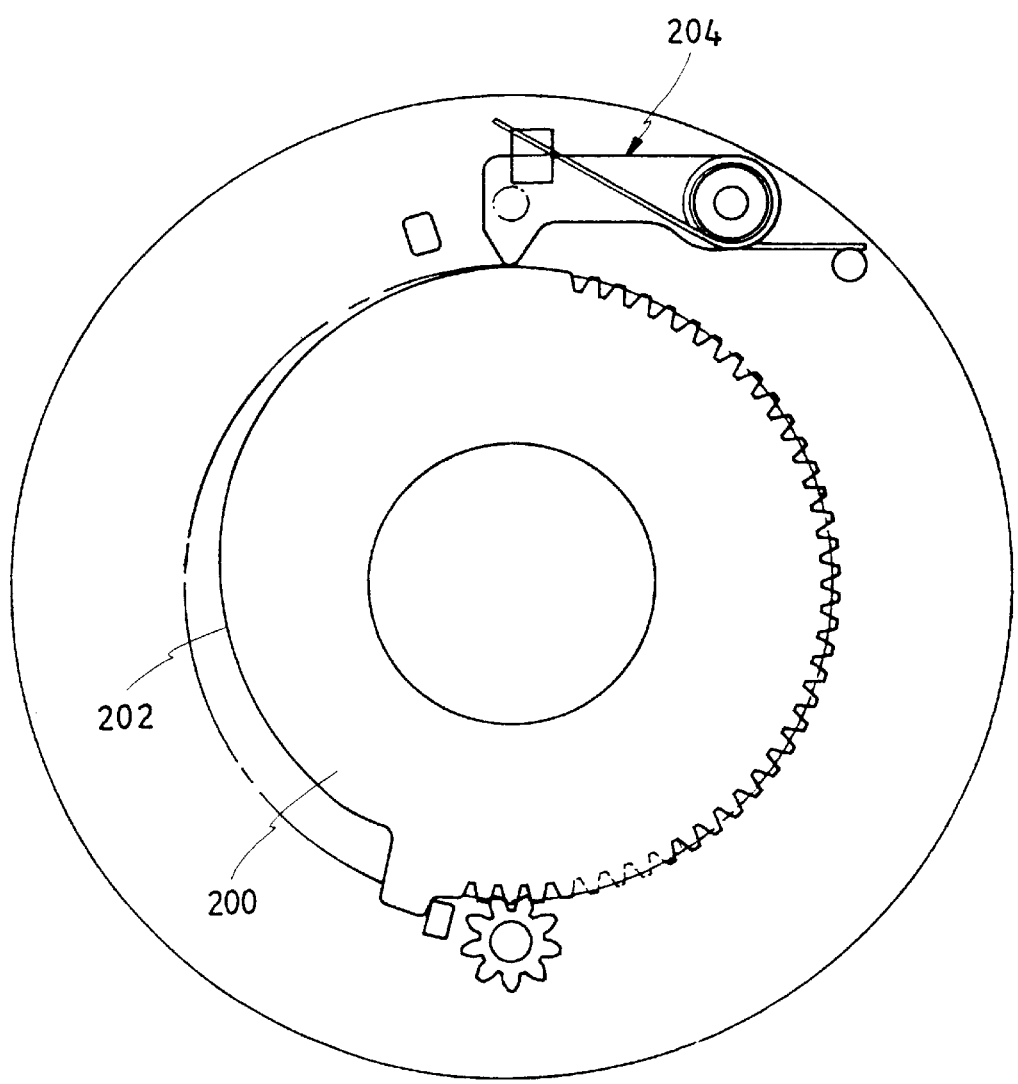
FIG. 7 is a front view of a diaphragm driving device at its initial setting according to the prior art.

When the hole formation portion of the diaphragm ring 20 passes the photo interrupter 10, different pulses are outputted depending on the existence of a hole so that the photo interrupter 10 can detect the position where holes 31 to 37 are located. When the initial position indicating hole 31 passes the photo-interrupter 10, a low state pulse as shown in FIG. 5B is generated with a long pulse width representing a period that is equivalent to many pulses of control signal as shown in FIG. 5A. On the other hand, when other position indicating holes 32 to 37 pass the photo-interrupter 10, a low state pulse shown in FIG. 5C is produced with a pulse width corresponding to a small number of control pulses. In this way, the photo interrupter can correctly detect the positions of the circular arc portions 52 to 57 corresponding to the aperture values.

Figure 4:
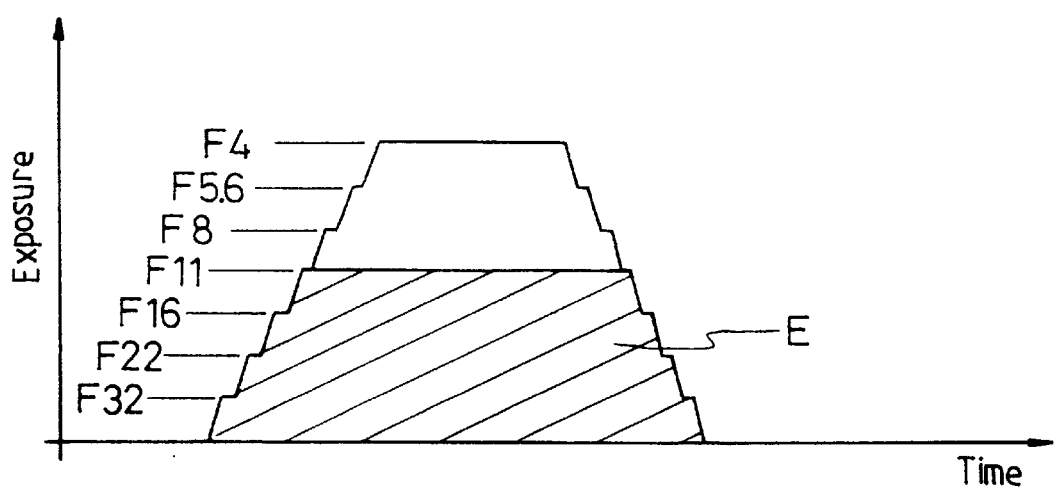
FIG. 4 is a graph showing the amount of camera exposure as a function of time according to the preferred embodiment.

FIG. 4 shows the amount of camera exposure made by the above-described diaphragm driving device. When the diaphragm ring 20 starts to rotate and the position detecting head 4 of the sector opening and closing device 2 contacts the rectilinear portions 22 to 27, the camera exposure is made along the left inclined line shown in FIG. 4. In contrast, when the position detecting head 4 contacts the circular arc portions 52 to 57, the camera exposure is made along the horizontal line shown in FIG. 4.

When the position detecting head 4 is stopped at the appropriate circular arc portion and a predetermined time is passed, the diaphragm ring 20 rotates inverse and, hence, the sector is closed along the right inclined line shown in FIG. 4.

Therefore, when the aperture value is determined to be F11, the amount of camera exposure corresponds to the deviant lined portion E shown in FIG. 4.

As described above, with the diaphragm driving device of the present invention, the sector camera can employ the aperture priority method. The desired aperture value is pre-determined by stopping the position detecting head 4 of the sector opening and closing device 2 at one of the circular arc portions 52 through 57 and, then, the desired opening time can be determined. Furthermore, the uneven camera exposure due to the overrun can be avoided.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of controlling exposure of a camera, wherein the camera includes a diaphragm ring comprising a cam side composed of a plurality of concentric circular arcs spaced apart from each other, with a plurality of respective radii each corresponding to one of a plurality of appropriate aperture values and a plurality of connecting portions interconnecting said plurality of concentric circular arcs, and a sector opening and closing device, said method comprising the steps of:

pre-determining a desired aperture value corresponding to one of said plurality of circular arcs;

rotating said diaphragm ring;

stopping rotation of said diaphragm ring when said sector opening and closing device is positioned on one of said plurality of concentric circular arcs corresponding to said desired aperture value; and keeping the opening of said sector for a predetermined time based on said step of stopping rotation.

2. The method of claim 1 wherein said plurality of connecting portions are rectilinear portions or curved portions.

3. The method of claim 1, wherein said plurality of concentric circular arcs are concentric with said diaphragm ring.

4. The method of claim 1, wherein said diaphragm ring further comprises a plurality of holes positioned in a substantially symmetrical fashion with respect to said plurality of concentric circular arcs, wherein a position sensing member is provided adjacent to said plurality of holes to detect a desired aperture value by sensing said plurality of holes, and wherein said rotation stopping of the diaphragm ring occurs when said position sensing member detects a hole corresponding to said desired aperture value.

5. The method of claim 4 wherein said position sensing member comprises a photo-interrupter.

6. A diaphragm driving device for a camera, wherein said camera includes a sector, said diaphragm driving device comprising:

a shutter base;

a driver installed on said shutter base;

a rotatable diaphragm ring concentrically placed on said shutter base and connected to said driver to receive rotational force, wherein said diaphragm ring further comprises:

a cam side composed of (i) a plurality of concentric circular arcs spaced apart from each other, with a plurality of respective radii corresponding to a plurality of appropriate aperture values; and (ii) a plurality of connecting portions interconnecting said plurality of concentric circular arcs; and a sector opening and closing device, wherein said sector opening and closing device opens and closes said sector by rotating along said cam side.

7. The diaphragm driving device of claim 6 wherein said plurality of connecting portions are rectilinear portions or curved portions.

8. The diaphragm driving device of claim 6, wherein said plurality of concentric circular arcs of said cam side are concentric with said diaphragm ring.

9. The diaphragm driving device of claim 6, further comprising:

a plurality of holes positioned on said diaphragm ring in a substantially symmetrical fashion with respect to said plurality of concentric circular arcs; and a position sensing member fixed on said shutter base, wherein said position sensing member detects a desired aperture value by sensing said plurality of holes.

10. The diaphragm driving device of claim 9 wherein said plurality of holes are spaced apart from each other by certain angles with respect to a center of said diaphragm ring.

11. The diaphragm driving device of claim 9 wherein an initial hole of said plurality of holes has a relatively large length, compared to other of said plurality of holes, and wherein said initial hole indicates an initial position of said diaphragm ring.

12. The diaphragm driving device of claim 9 wherein said position sensing member comprises a photo-interrupter.

13. The diaphragm driving device of claim 12 wherein said photo-interrupter is positioned within an area where said initial hole is placed at said initial position of the diaphragm ring.

* * * * *